United States Patent [19]

Moore

[11] 4,056,341

[45] Nov. 1, 1977

[54] PRESSES

[76] Inventor: Anthony John Moore, Farms Splitrock, Ezulweni, Swaziland, South Africa

[21] Appl. No.: 718,471

[22] Filed: Aug. 30, 1976

[30] Foreign Application Priority Data

Sept. 5, 1975 South Africa ........................ 75/5683

[51] Int. Cl.$^2$ ........................... B29C 3/00; B30B 11/32

[52] U.S. Cl. ........................................ 425/77; 425/411

[58] Field of Search ........................ 425/32, 33, 17, 19, 425/20, 21, 22, 23, 24, 47, 405 H, 406, 410, 411, 412, 415, 77, 242 R, DIG. 223

[56] References Cited

U.S. PATENT DOCUMENTS

| | | | |
|---|---|---|---|
| 1,566,259 | 12/1925 | Colvin | 425/47 |
| 2,270,817 | 1/1942 | Allen | 425/47 |
| 2,393,503 | 1/1946 | Bosomworst et al. | 425/47 |
| 2,916,772 | 12/1959 | MacDonald | 425/20 |
| 3,423,502 | 1/1969 | Stimpson | 425/DIG. 223 |
| 3,474,499 | 10/1969 | Holmes | 425/47 |
| 3,577,590 | 5/1971 | Dawson et al. | 425/77 |
| 3,577,596 | 5/1971 | Bullard et al. | 425/242 R X |
| 3,635,611 | 1/1972 | Mapel | 425/47 |
| 3,657,917 | 4/1972 | Chelminski | 425/77 X |
| 3,674,403 | 7/1972 | Jonsson et al. | 425/77 |

*Primary Examiner*—J. Howard Flint, Jr.
*Attorney, Agent, or Firm*—Cushman, Darby & Cushman

[57] ABSTRACT

A press comprises an open-topped cylinder in which a piston is moved by the injection of hydraulic fluid. The cylinder has a flange and is capped by a flanged lid. Clamping elements clamp the two flanges together. The plattens between which the high pressure reaction takes place are carried by the piston and by the lid.

5 Claims, 3 Drawing Figures

PRESSES

This invention relates to presses of the kind used in high pressure operations where it is required to create extremely high pressures such as are needed for certain extrusion operations, diamond synthesis or the synthesis of cubic boron nitride.

Known apparatus of this kind comprises two plattens which between them press some kind of pressure emplifying and containing assembly such as the well known belt apparatus see U.S. Pat. No. 2,941,248 to Hall. One platten is pressed upon by a hydraulically actuated piston moving in a cylinder and the second platten is fixed relatively to the cylinder.

If extrusion is to be practised, one platten is fitted with the extrusion die.

The two plattens must move in absolute parallelism, albeit over a very short stroke. Also both plattens must be accurately aligned with reference to the longitudinal axis of the cylinder in which the piston moves.

Conventionally the second platten is held by an abutment which in turn is supported on a massive yoke or on fixed columns. Nevertheless it is difficult to obtain perfect alignment and parallelism.

According to the invention a press comprises a cylinder closed at one end, a piston adapted to move in the cylinder towards the other end of the cylinder on its pressure stroke, means adapted to blind the other end of the cylinder, and opposed plattens carried on the piston and the blinding means.

In one form of the invention the cylinder is open at a first end and closed at a second end opposed to the first end, includes a lid to the first end and means to clamp the lid to the cylinder so that the lid forms the blinding means.

Figure 1:
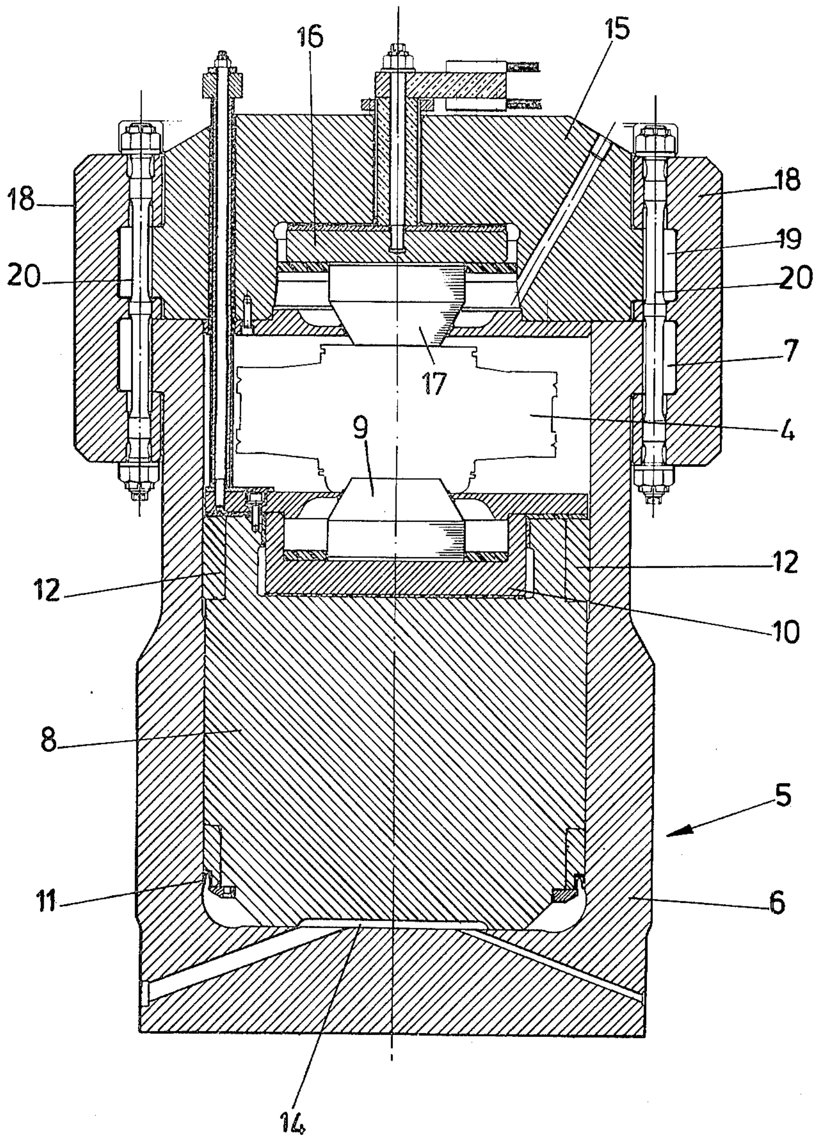
Figure 2:
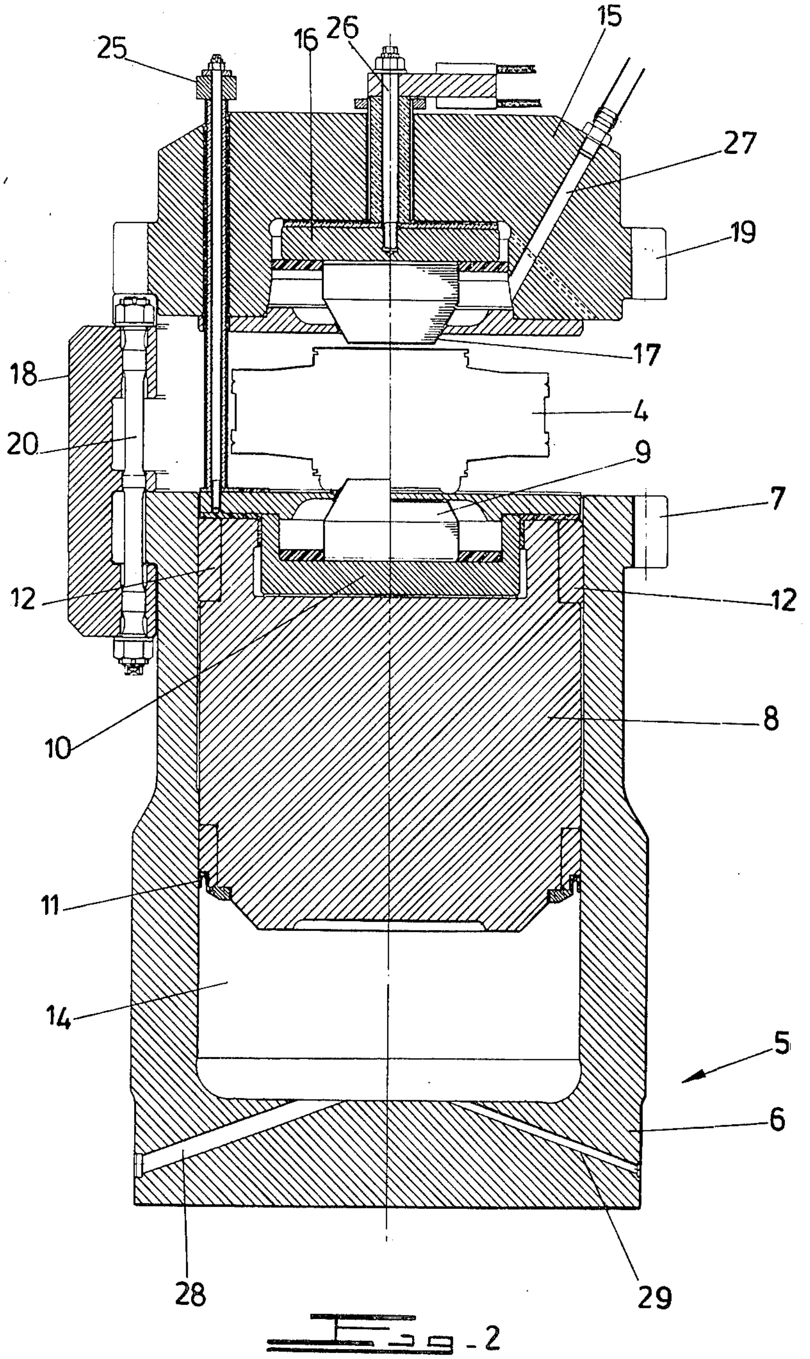
Figure 3:
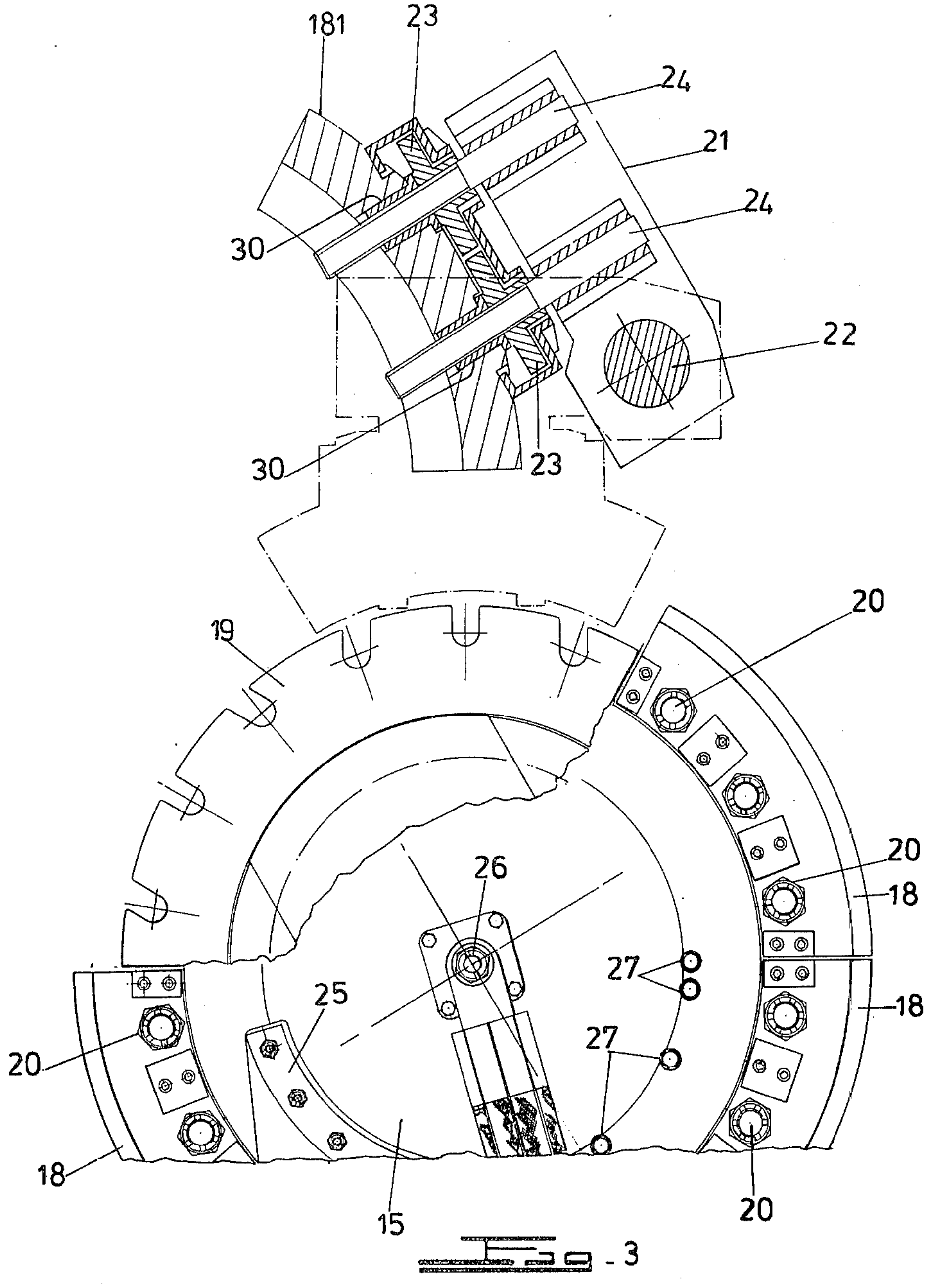

The invention is further discussed with reference to the accompanying drawings, in which FIG. 1 is a section through a press according to the invention and ready for high pressure operation, FIG. 2 is a section through the same press with the lid open, and FIG. 3 is a plan view with parts broken away illustrating the clamping segments.

The press illustrated comprises firstly a cylinder 5. This cylinder 5 around its base has a thickened portion 6 to be discussed later on and a flange 7. Inside the cylinder 5 is a piston 8 carrying a platten 10 and a backing block 9. The main piston seal is the one marked 11. At the top there is a guide ring 12 of a flexible construction which allows for accommodation of irregularities.

In FIG. 1 the flanges 7 and 19 are shown locked together by annular segmental clamps 18.

Each segmental clamp 18 is of substantially flat U-shape in cross-section. In order to keep the opposed legs of the U in shape under the pressures acting in the press, each clamp 18 is provided with a series of bolts 20 which act to stiffen the clamps against opening.

For gaining access to the space between the plattens 10 and 17 when the press is open, it is necessary to be in position to detach the clamps. The method of attaching and detaching the clamps 18 is shown in FIG. 3. For the sake of simplicity only one clamp 181 has been illustrated with its detaching mechanism in section.

As shown in FIG. 3 the clamp 181 is shown to be carried by an arm 21 which can swing about a fixed pivot 22. The clamp 181 is fitted with a reversibly driven gear (not shown) which meshes with two pinions 23. The pinions 23 have internally threaded bushes 30 engaged with complemental threads on rods 24 which are firmly anchored on the arm 21. Thus as the pinions 23 rotate the clamp 181 moves parallel to itself and towards or away from the arm 21. For the clamp 181 to perform a clamping or lid-supporting function, the arm 21 is first swung into the chain line position illustrated in FIG. 3 i.e. the clamp 181 is now on a circle concentric with the lid 15. Thereafter the motors 23 are run in a direction to move the clamp 181 radially inwardly towards the lid 15 and the cylinder 5.

Since it is usually adequate to provide access from one direction only, it is only necessary to swing two clamps 18, such as the clamp 181 and the one immediately adjacent it, away from the press in the manner illustrated but in the opposite direction. The remaining clamps 18 may be withdrawn and engaged by attaching the radially inner ends of the rods 24 to the flange 7 and dispersing with those portions which in the case of the clamp 181 engage with the arm 21. In these latter cases the arm 21 and the pivot 22 are also not needed. Of course, if greater access is required, more clamps 18 can be operated in the same way as the clamp 181.

The plattens 10 and 16 may be caused to act upon a wide variety of pressure systems. As shown they have backing blocks 9 and 17 of the kind suitable to act on a belt type assembly. In the drawings such an assembly is shown in rough outline and marked 4.

In order to get heating current to the assembly 4 electrodes 25 and 26 are passed through the lid 15 with the electrode 25 having lost motion with the lid 15. Cooling fluid may, if required be passed to the assembly 4 along passages 27. The plattens 16 and 10 are suitably insulated from the rest of the apparatus in a well known manner to prevent short-circuiting of the hearing current.

At its base the cylinder 5 has an inlet passage 28 for pressure fluid and a pressure gauge passage 29.

In use one starts from the FIG. 2 position. In this position low pressure hydraulic fluid has been injected into a space 14 below the piston 8 to raise it. Since only low pressure fluid is present the walls of the cylinder 5 need not be extremely thick. The assembly 4 is then positioned between the backing blocks 9 and 17. Next the clamps 18 are withdrawn and the piston 8 lowered to the position shown in FIG. 1. All the clamps are then positioned as shown in FIG. 1. High pressure fluid is then let into the space 14 which is very small. At this stage the thick wall 6 is called for. The piston 8 performs its action on the assembly 4 and moves through a relatively short stroke.

After a predetermined time, high pressure is released, the clamps 18 are withdrawn, low pressure fluid is admitted and the press is returned to the FIG. 2 position. Some clamps 18 are repositioned so that the lid 15 rests on the cylinder 5 via these clamps. The assembly 4 is now removed and a fresh assembly inserted for the next operation.

I claim:

1. A press comprising:

a cylinder closed at one end, a piston adapted to move in the cylinder towards and out of the other end of the cylinder and having a length less than that of the cylinder, a platten carried by the cylinder, a circumferential flange around the other end of the cylinder and integral with the cylinder, a lid adapted to rest on the other end of the cylinder to close it off, a platten carried by the lid and facing the platten on the cylinder, a circumferential flange on the lid, integral with the lid and registering with the cylinder flange when the lid is closed, and clamping segments movable to sandwich the flanges between them to form a continuous ring around the flanges.

2. The press claimed in claim 1 in which at least some of the segments are movable to space the lid from the cylinder when the lid is lifted off the cylinder.

3. The press claimed in claim 2 in which the segments are movable parallel to themselves towards and away from the sandwiching position by means of screw jacks.

4. The press claimed in claim 3 in which the screw jacks comprise rotatable bushes on the segments and screwed rods secured to structure fixed relative to the cylinder.

5. The press claimed in claim 4 in which the fixed structure in the case of at least some segments comprise in each case an arm pivoted about a fixed point so that the segment in question can be swung out of the way.

* * * * *